(12) United States Patent
Smith et al.

(10) Patent No.: US 7,738,426 B2
(45) Date of Patent: Jun. 15, 2010

(54) ROAMING GATEWAY

(75) Inventors: Ian Smith, County Meath (IE); Aidan Dillon, County Dublin (IE)

(73) Assignee: Accuris Technologies Limited, Dublin (IE)

( * ) Notice: Subject to any disclaimer, the term of this patent is extended or adjusted under 35 U.S.C. 154(b) by 240 days.

(21) Appl. No.: 11/884,002

(22) PCT Filed: Feb. 14, 2006

(86) PCT No.: PCT/IE2006/000009
§ 371 (c)(1),
(2), (4) Date: Aug. 9, 2007

(87) PCT Pub. No.: WO2006/085295
PCT Pub. Date: Aug. 17, 2006

(65) Prior Publication Data
US 2008/0267199 A1   Oct. 30, 2008

(30) Foreign Application Priority Data
Feb. 14, 2005   (IE) ................................. 2005/0074

(51) Int. Cl.
H04W 4/00   (2009.01)
H04W 36/00   (2009.01)
(52) U.S. Cl. ...................................... 370/331; 455/439
(58) Field of Classification Search .................... None
See application file for complete search history.

(56) References Cited
U.S. PATENT DOCUMENTS
6,453,174 B1   9/2002   Cunningham et al. ........ 455/560

2002/0161855 A1*  10/2002  Manczak et al. ............ 709/219
2003/0027569 A1*   2/2003  Ejzak .......................... 455/432
2005/0010692 A1*   1/2005  Jain et al. .................... 709/249
2005/0130632 A1*   6/2005  Park ......................... 455/414.1

FOREIGN PATENT DOCUMENTS
WO         02/45440      6/2002
WO       2004/084472     9/2004

OTHER PUBLICATIONS

XP001143468, Haverinen et al., Cellular Access Control and Charging for Mobile Operator Wireless Local Area Networks, IEEE Wireless Communications, vol. 9, No. 6, 2002, pp. 52-59.

* cited by examiner

Primary Examiner—Chirag G Shah
Assistant Examiner—Amarnauth Persaud
(74) Attorney, Agent, or Firm—Jacobson Holman PLLC

(57) ABSTRACT

A gateway (1) resides in an IP-based network. It acts as a controlling or home HLR for a mobile device roaming in this network, emulating an MSC or VLR to the home network HLR. Thus, as far as the home network HLR is aware, the subscriber is roaming in a foreign network of equivalent type of technology. Meanwhile, the gateway of the invention manages a subscriber profile and authentication as if the visited network were the home network. In fact, the gateway in combination with the home network HLR acts as an IMS-standard HSS. The gateway (1) enables wireless carriers to use existing legacy network infrastructure to provide a smooth evolution to the next generation network architecture, and it supports voice and data inter-working between existing 2/2.5G networks and next-generation IP based networks. For inter-standard roaming, the gateway 1 extends the existing roaming footprint of an ANSI-41 subscriber roaming in GSM foreign mode. In GSM foreign mode, the ANSI-41 subscriber may roam onto alternative access networks using a sponsor GSM IMSI.

7 Claims, 7 Drawing Sheets

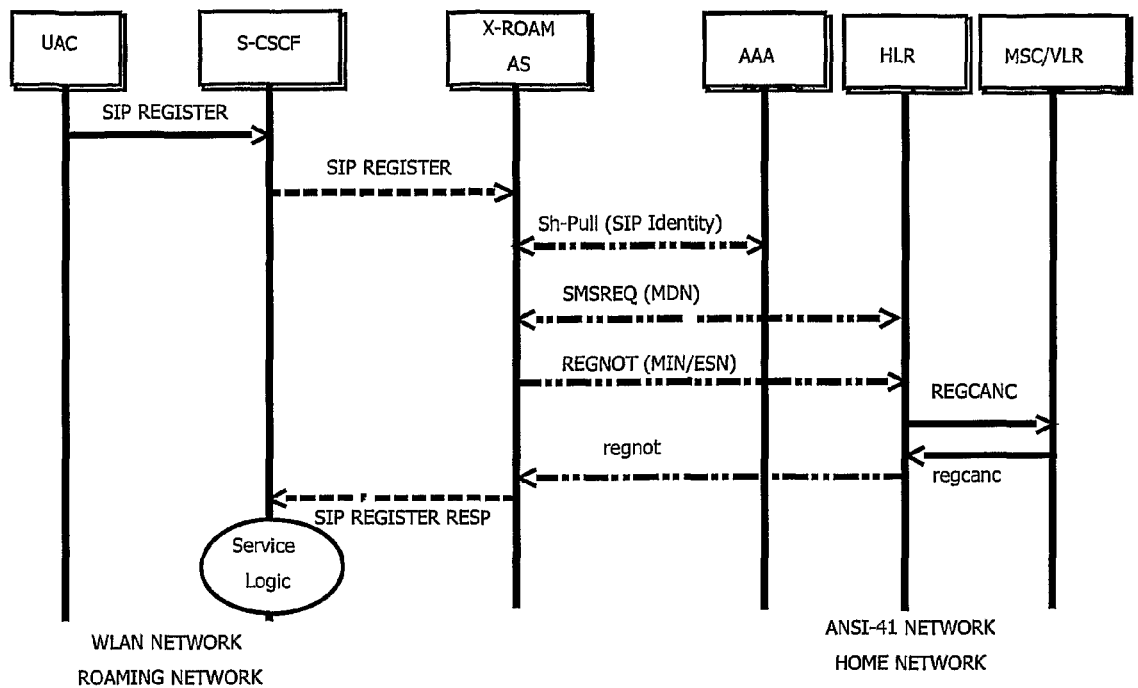
Location Registration Fig.3
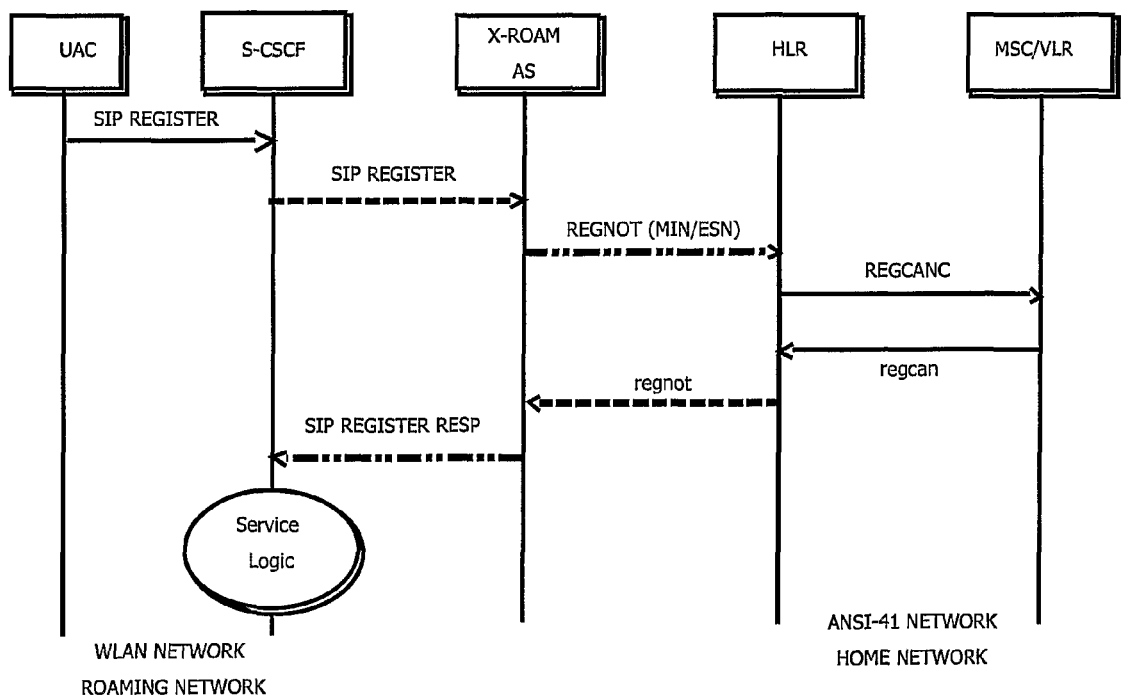
Location Registration Fig.4

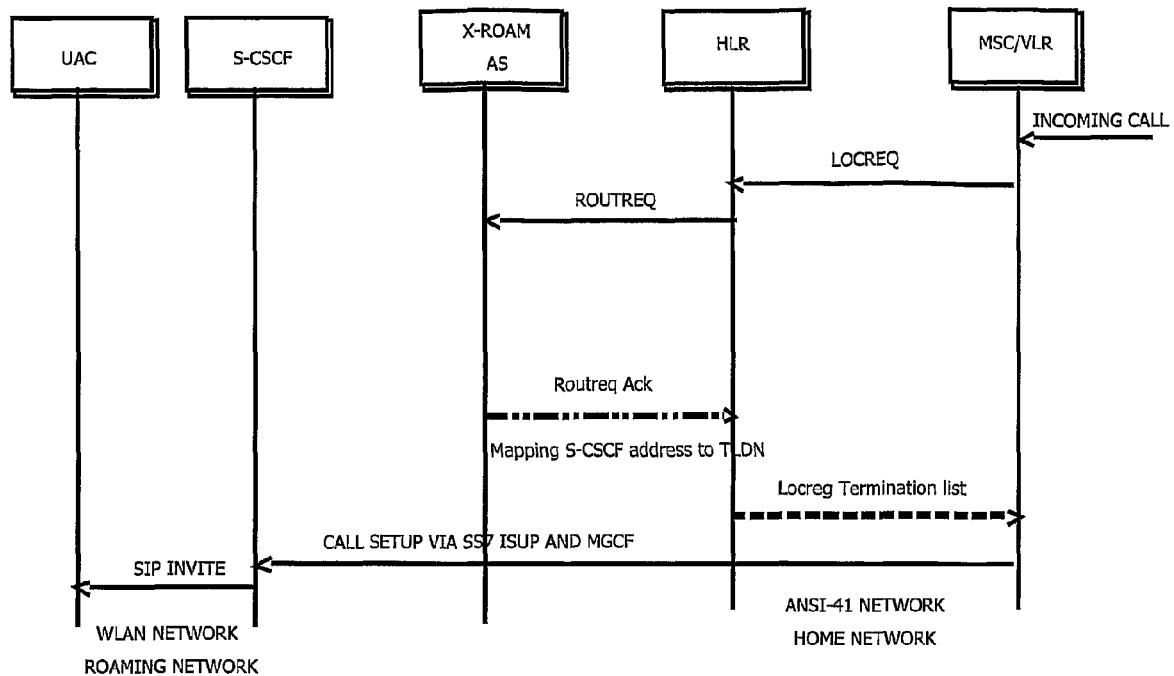
Mobile Terminated call Fig.5
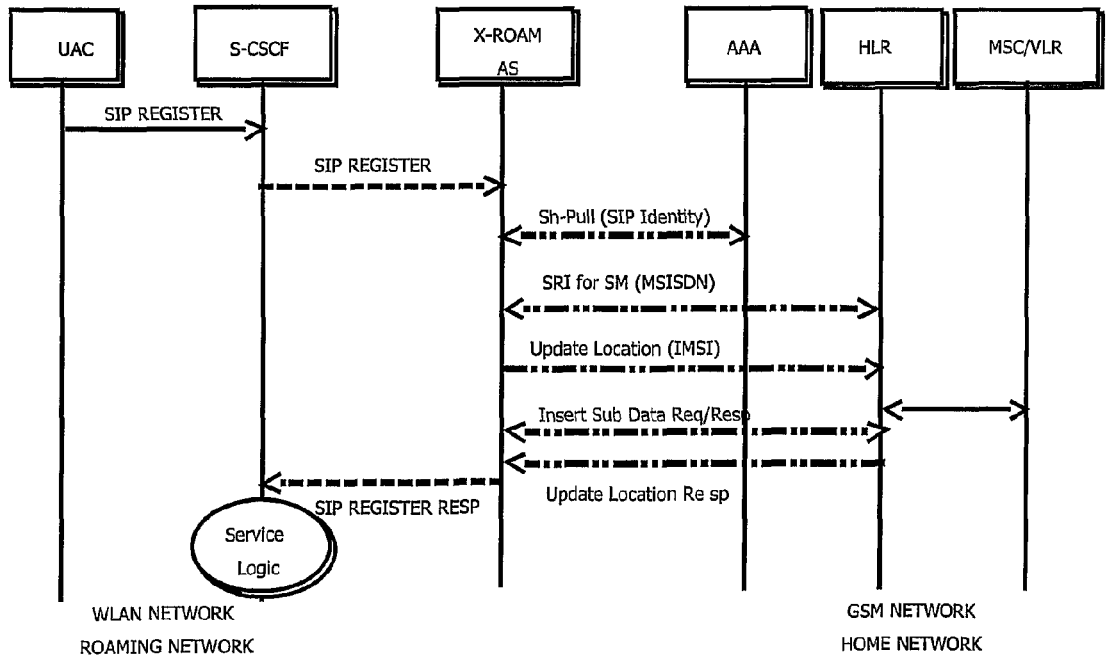
Pre-Provisioned Location Registration Fig.6

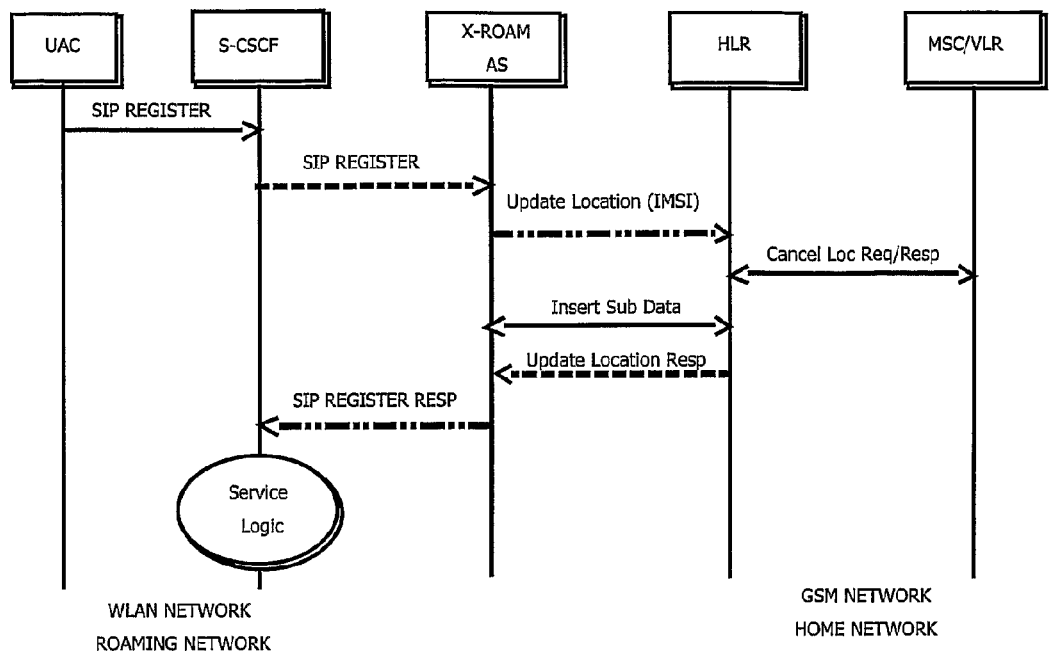
Location Registration Fig.7
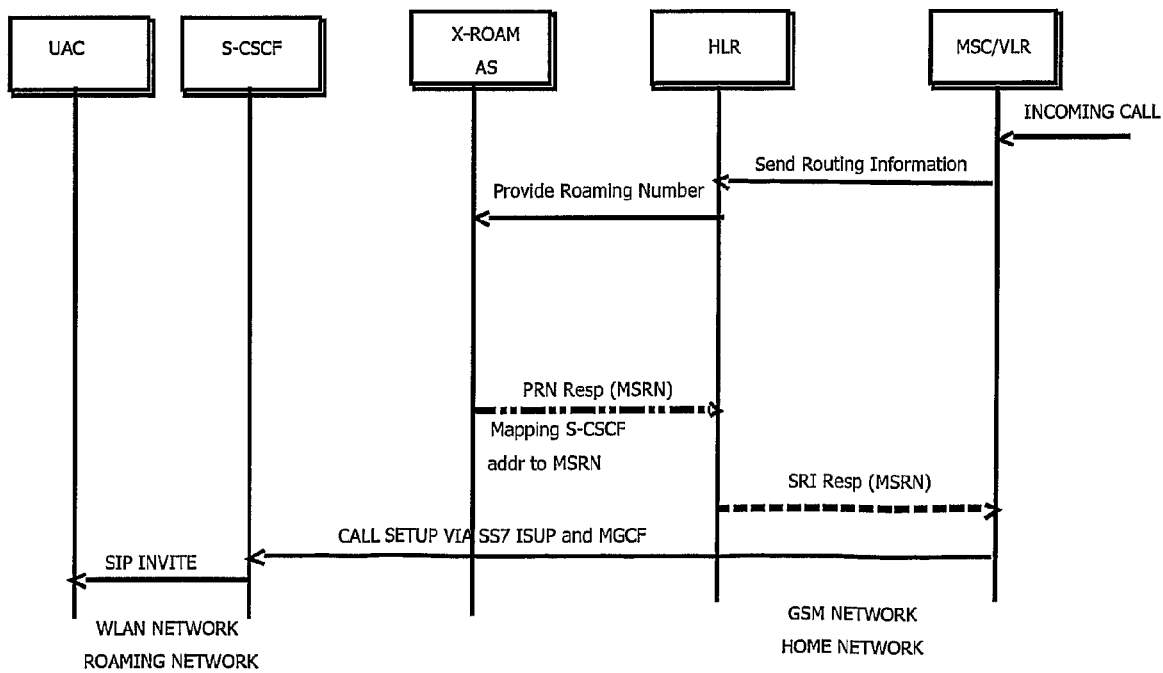
Mobile Terminated Call Fig.8

ROAMING GATEWAY

This is a national stage of PCT/IE2006/000009 filed Feb. 14, 2006 and published in English.

The invention relates to a roaming gateway for interworking between mobile networks.

U.S. Pat. No. US6,453,174 describes a roaming gateway, especially for GSM-ANSI41 interworking.

While such prior gateways operate satisfactorily for interworking between conventional mobile networks based on signalling mechanisms such as SS7, there is a need for a more versatile interworking capability. This is particularly so with the advent of 3G IP networks and even "4G" networks which have only packet-based communication. For example, a user of a mobile device may temporarily roam into coverage of a WLAN 3G IP network and require use of this network for a temporary period.

In this specification some industry-standard acronyms are used. These are specified in various published sources, such as the 3GPP TR 21.905 V7.0.0 (2005-09) Technical Report and the Session Initiation Protocol specifications of the Internet Official Protocol Standards.

The present invention is directed towards providing a gateway with improved versatility.

SUMMARY OF THE INVENTION

According to the invention, there is provided a roaming gateway comprising:
an interworking processor;
at least one signalling stack for communication with a non-packet mobile network;
a packet interface for communication with a home packet-based network in which it resides; and
an emulator in the interworking processor for emulating a non-packet mobile network entity to a foreign non-packet network HLR.

In one embodiment, the emulator emulates a VLR or an MSC to the HLR.

In one embodiment, the inter-working processor dynamically manages a subscriber profile.

In one embodiment, the inter-working processor maintains a WLAN and a SIP subscriber profile.

In another embodiment, the inter-working processor comprises a function for performing subscriber authentication.

In one embodiment, said function performs IMSI-based authorisation.

In one embodiment, said function performs IMSI-based authentication according to RADIUS, DIAMETER SIM, and USIM methods.

In one embodiment, said authentication function performs IMS-type authentication without a HSS in the packet network.

In one embodiment, the processor comprises functions in an application server, and a plurality of database servers.

In one embodiment, the database servers provide redundancy in subscriber data storage.

In one embodiment, the gateway acts as a proxy to receive SIP register requests from a CSCF element, and to communicate with a different network for subscriber registration.

In one embodiment, the gateway performs filtering of register requests to determine those it can act upon.

In one embodiment, the gateway relays the SIP register requests back to the transmitting CSCF for onward processing.

In one embodiment, the gateway stores subscriber identity information for downstream use, for example, for a subsequent location registration.

In one embodiment, the inter-working processor is configured to receive a route request from an element such as a HLR of a different network.

In one embodiment, the inter-working processor automatically performs anti-restricted roaming by stopping attempts to prevent a subscriber registering with a foreign network after only a limited number of tries.

In one embodiment, the present invention provides a non-transitory computer readable medium comprising software code for performing operations of the roaming gateway described above when executed on a digital processor.

BRIEF DESCRIPTION OF THE DRAWINGS

The invention will be more clearly understood from the following description of some embodiments thereof, given by way of example only with reference to the accompanying drawings in which:—

FIGS. 3 to 8 are signal transfer diagrams illustrating operation of the gateway.

DETAILED DESCRIPTION OF THE INVENTION

A gateway of the invention resides in an IP-based network. It acts as a controlling or home HLR for a mobile device roaming in this network, emulating an MSC or VLR to the home network HLR. Thus, as far as the home network HLR is aware, the subscriber is roaming in a foreign network of equivalent type of technology. Meanwhile, the gateway of the invention manages a subscriber profile and authentication as if the visited network were the home network. In fact, the gateway in combination with the home network HLR acts as an IMS-standard HSS.

The gateway 1 enables wireless carriers to use existing legacy network infrastructure to provide a smooth evolution to the next generation network architecture, and it supports voice and data inter-working between existing 2/2.5G networks and next-generation IP based networks.

For inter-standard roaming, the gateway 1 extends the existing roaming footprint of an ANSI-41 subscriber roaming in GSM foreign mode. In GSM foreign mode, the ANSI-41 subscriber may roam onto alternative access networks using a sponsor GSM IMSI.

The gateway 1 maintains a WLAN and SIP user profile that would normally reside in a next generation HSS, and the gateway provides:
  IMSI-based subscriber authentication via RADIUS and DIAMETER SIM and USIM methods,
  IMSI-based authorisation via RADIUS and DIAMETER methods,
  Mobility Management for SIP-based devices via a MAP/SIP inter-working function,
  Mobile Terminated call routing via an on-board MSC emulator and integrated softswitch/media gateway, and
  SMS termination via an on-board MSC emulator and IP messaging gateway.

Figure 1:
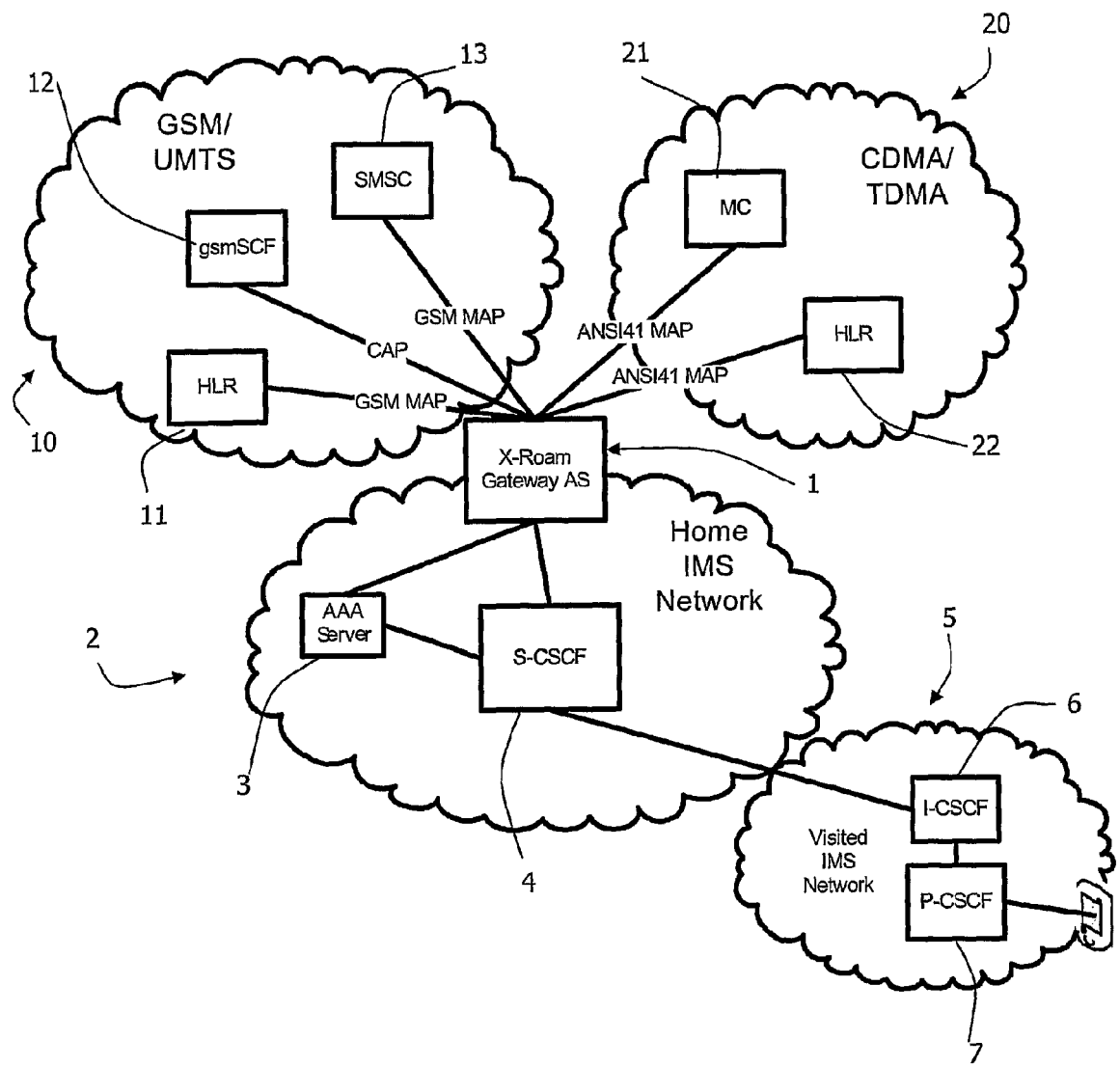
FIG. 1 is a diagram showing a gateway of the invention and its links with various networks.

Referring to FIG. 1 a roaming gateway 1 is located in a home IMS network 2 having a DIAMETER based AAA server 3 and an S-CSCF 4. These elements are linked with corresponding elements 6 and 7 of a visited IMS network 5. The gateway 1 contains its own AAA server. In another embodiment the AAA server is an external element. However, the AAA server and X-Roam AS together provide HSS functionality to the IMS network. This means an operator can deploy a SIP-based network (for example, an IMS network) and re-use their existing HLR, avoiding migration of subscribers from the HLR to a new standalone HSS.

The gateway 1 communicates with elements in a GSM/UMTS network 10, namely a HLR 11, a GSMSCF 12, and an SMSC 13. It also communicates with elements in a CDMA/TDMA network 20, namely an MC 21 and a HLR22.

The gateway 1 provides enhanced roaming functionality allowing:
 SIM/USIM based Authentication methods.
 WLAN roaming and interworking with GSM/UMTS core network.
 SMS/MMS deliver to/from GSM/UMTS core network.
 Interworking with CAMEL service environment.

It will be noted that:
 SMS/MMS interworking allows an operator to re-use their existing messaging infrastructure for SIP based networks.
 CAMEL interworking allows a GSM operator to re-use their existing IN infrastructure for SIP based networks.
 WIN interworking allows a CDMA/TDMA operator to re-use their existing IN infrastructure for SIP based networks.

Interworking between IMS and ANSI-41 based networks such as TDMA and CDMA is not defined within the standards. However, the gateway 1 performs the following:
 Allowing an IMS subscriber to roam in TDMA/CDMA networks using their IMS identities that are mapped in X-Roam to TDMA/CDMA identities. The subscriber is reachable on his IMS identity for the purposes of call termination, SMS delivery.
 RADIUS based Authentication methods interworking with IS-853 AAA servers.
 WLAN roaming and interworking with CDMA/TDMA core network.
 SMS/MMS deliver to/from CDMA/TDMA core network.
 Interworking with Wireless Intelligent Network (WIN) services.

Figure 2:
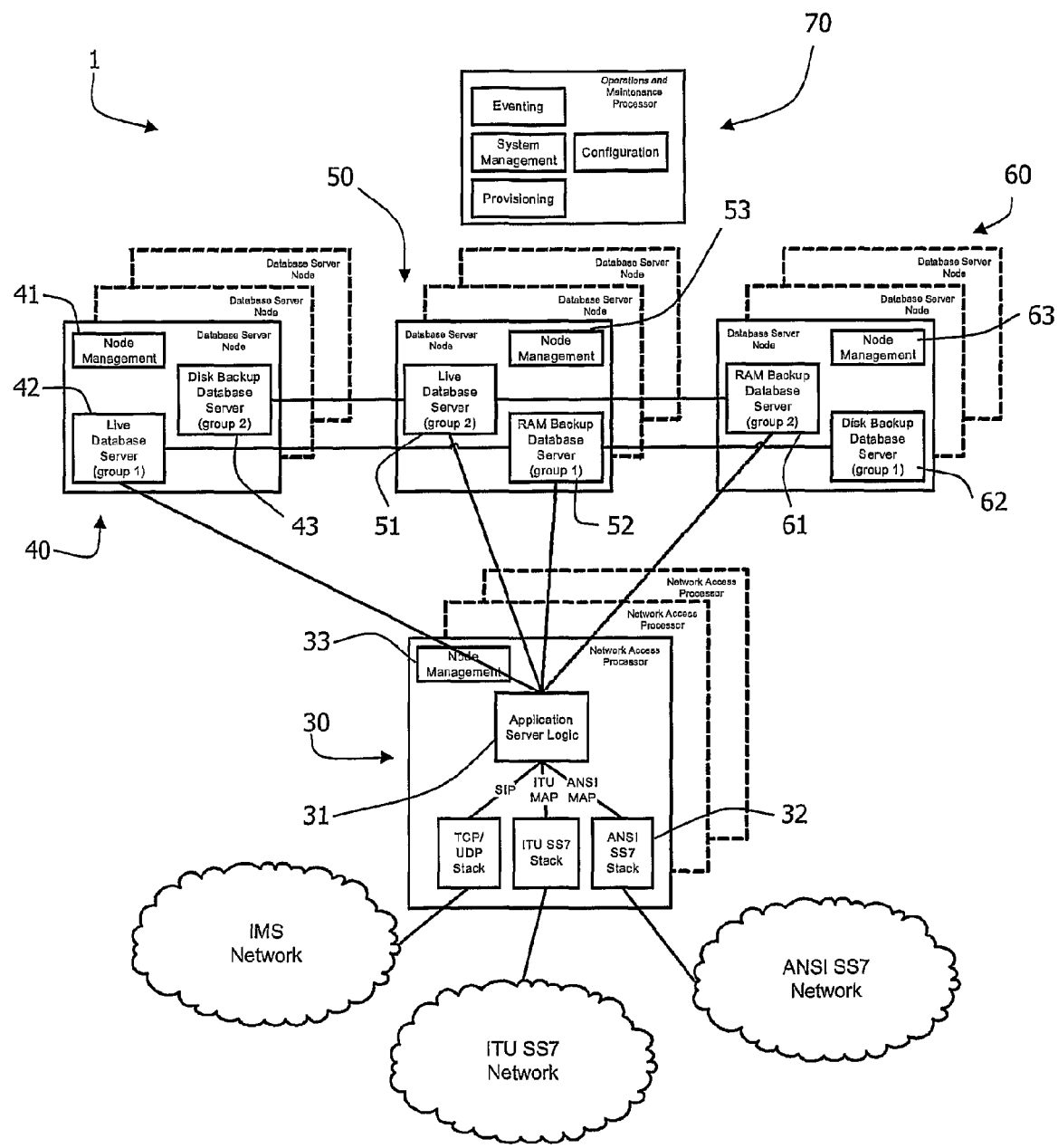
FIG. 2 is an architectural diagram of the gateway.

Referring to FIG. 2 the gateway 1 ("X-ROAM") comprises a number of network access processors 30, each having application server logic 31, stacks 32 for communication with the different networks, and node management functions 33. The gateway 1 also comprises three sets of database server nodes 40, 50 and 60. The nodes 40 each comprise node management functions 41, a live database server (Group 1), and a disk backup database server (Group 2) 43. The nodes 50 each comprise a live database server (Group 2) 51, a FAM database server (Group 1), and node management functions 53. The nodes 60 each comprise a RAM database server (Group 2) 61, a disk backup database server (Group 1) 62, and node management functions 63. The gateway 1 further comprises an OMP node 70.

The operations and maintenance processor (OMP) is a backend node which takes care of system startup/shutdown, raising events and alarms with network management systems and other 'management' tasks. Subscribers are provisioned through the OMP, and the records stored. The database server is a RAM or disk database used to store subscriber information. Its information is replicated to at least one peer database server in real time. The network access processors (NAP) contain the logic of the gateway 1. They provide the interfaces to the networks. The NAP provides protocol interworking and uses the database servers to create, read and update subscriber records.

The following describes the gateway logic, with reference to FIGS. 3 to 8.

Pre-Provisioned Location Registration for CDMA Subscriber Roaming in WLAN (see FIG. 3).

The S-CSCF is configured to forward any SIP REGISTER requests it receives to the gateway 1. The decision at the S-CSCF is based on filter information received from the HSS. There are two ways for the S-SCSF to decide whether to forward the SIP REGISTER:
 If the S-CSCF knows the P-CSCF serves a WLAN, the gateway 1 will receive the SIP REGISTER.
 Alternatively, all SIP REGISTERs can be forwarded to the gateway 1, and the gateway 1 can perform filtering of the P-Visited-Network-ID header from the P-CSCF in deciding the access network type i.e. WLAN or CDMA packet data network.

The gateway 1 will act as a SIP proxy without making any modification to the SIP REGISTER headers apart from preventing looping of the SIP REGISTER messages between Application Servers by including the gateway's own SIP URI in the PATH header. The gateway 1 will always relay the SIP REGISTER back to the S-CSCF for onward processing to other application servers.

When it receives the SIP REGISTER, the gateway 1 examines the User Identity within the SIP REGISTER. If the SIP User Identity is recognised as the MDN of a subscriber provisioned on the system, the gateway 1 will retrieve the MSID and ESN for the subscriber from its database.

If the MSID and ESN are not known, the gateway 1 will resolve the MSID/ESN pair by sending an MDN based SMSREQ to the subscribers HLR. In this way, there will be no requirement to pre-provision the MDN, MSID and ESN for all WLAN roamers. The gateway 1 will automatically store these triplets in its database.

If the SIP User Identity within the SIP REGISTER is not recognised as an MDN, the gateway 1 will either forward a Sh-Pull to the DIAMETER AAA to resolve the MDN of the WLAN roamer (assuming its provisioned in the AAA), or alternatively perform an ENUM DNS lookup to resolve the MDN. Having identified the WLAN roamers MDN, the gateway 1 will resolve the MSID and ESN before sending the REGNOT to the HLR.

Once the MSID and ESN have been established, the gateway 1 will send an ANSI-41 REGNOT to the CDMA HLR giving an MSC ID and VLR ID of the gateway 1. The CDMA network now believes the subscriber to be located at a VLR/MSC at the gateway's address.

On receipt of the ANSI-41 REGNOT response, the SIP REGISTER is responded to so that the S-SCSF can continue processing.

Subsequent Location Registration for CDMA Subscriber Roaming in WLAN (see FIG. 4).

Here, actions are as above except that there is no need to retrieve the MSID/ESN information from external sources as it is stored from the previous registrations.

Mobile Terminated Call for CDMA Subscriber Roaming in WLAN (see FIG. 5).

When there is a mobile terminated call for the subscriber, the gateway 1 will receive a ROUTEREQ from the HLR.

The gateway 1 will maintain a Routing Area to TLDN translation table. This TLDN is returned to the HLR and this will allow the ISUP call setup (IAM) to be routed to an appropriate MGCF which forwards a SIP INVITE message to the S-CSCF based on TLDN.

Pre-Provisioned Location Registration for GSM Subscriber Roaming in WLAN (see FIG. 6).

As in the first scenario above, the S-CSCF is configured such that it will forward any SIP REGISTER requests it received to the gateway 1. The decisions in the S-SCSF are the same, regardless of whether the subscriber is a CDMA subscriber or a GSM subscriber.

The gateway 1 is acting as a SIP proxy and performs the same modification of the SIP REGISTER as far as the S-SCSF is concerned.

However, in this case, when it receives the SIP REGISTER, the gateway 1 will examine the User Identity within the SIP REGISTER. If the SIP User Identity is recognised as the MSISDN of a subscriber provisioned on the system, the gateway 1 will retrieve the IMSI for the subscriber from its database.

If the IMSI is not known, the gateway 1 will resolve the IMSI by sending an MSISDN based SEND_ROUTING_INFO_FOR_SM to the subscribers HLR. In this way, there will be no requirement to pre-provision the MSISDN and IMSI for all WLAN roamers. The gateway 1 will automatically store these pairs in its database.

If the SIP User Identity within the SIP REGISTER is not recognised as an MSISDN, the gateway 1 will either forward a Sh-Pull to the DIAMETER AAA to resolve the MSISDN of the WLAN roamer (assuming its provisioned in the AAA), or alternatively perform an ENUM DNS lookup to resolve the MSISDN. Having identified the WLAN roamers MSISDN, the gateway 1 will resolve the IMSI before sending the UPDATE_LOCATION to the HLR.

Once the IMSI has been established, the gateway 1 will send an UPDATE_LOCATION to the GSM HLR giving an MSC address and VLR address of the gateway 1. The GSM network now believes the subscriber to be located at a VLR/MSC at the gateway's address.

On receipt of the UPDATE_LOCATION response, the SIP REGISTER is responded to so that the S-SCSF can continue processing.

Subsequent Location Registration for GSM Subscriber Roaming in WLAN (see FIG. 7).

Here actions are as in the previous scenario except that there is no need to retrieve the IMSI information from external sources as it is stored from the previous registrations.

Mobile Terminated Call for GSM subscriber roaming in WLAN (see FIG. 8).

When there is a mobile terminated call for the subscriber, the gateway 1 will receive a PROVIDE_ROAMING_NUMBER from the HLR.

The gateway 1 will maintain a Routing Area to MSRN translation table. This MSRN is returned to the HLR and this will allow the ISUP call setup (IAM) to be routed to an appropriate MGCF which forwards a SIP INVITE message to the S-CSCF based on MSRN.

Another aspect of the gateway is that it implements a method called in this specification "anti-restricted roaming". When the subscriber roams out of the home network the device iteratively polls the home network for acceptance of a succession of visited networks. The home network rejects a certain number, up to a limit according to technical and/or business criteria. However, if the gateway of the invention roams in a visited network it routes a request for its network repeatedly until it is accepted.

In general, network-based restricted roaming products work by sending back an error to the initial update location causing the handset to attempt to register with a different network. However, these restricted roaming products must allow for the possibility that the subscriber has manually set the preferred network on the handset and therefore cannot be steered away. The normal method of detecting this is by checking for a number of successive Update Location attempts from the same VLR within a short time period. When the restricted roaming platform detects such a situation it must forward the update location to the subscribers HLR and allow the subscriber to be registered, as leaving the subscriber unregistered with any network is obviously a less favourable option.

Figure 9:
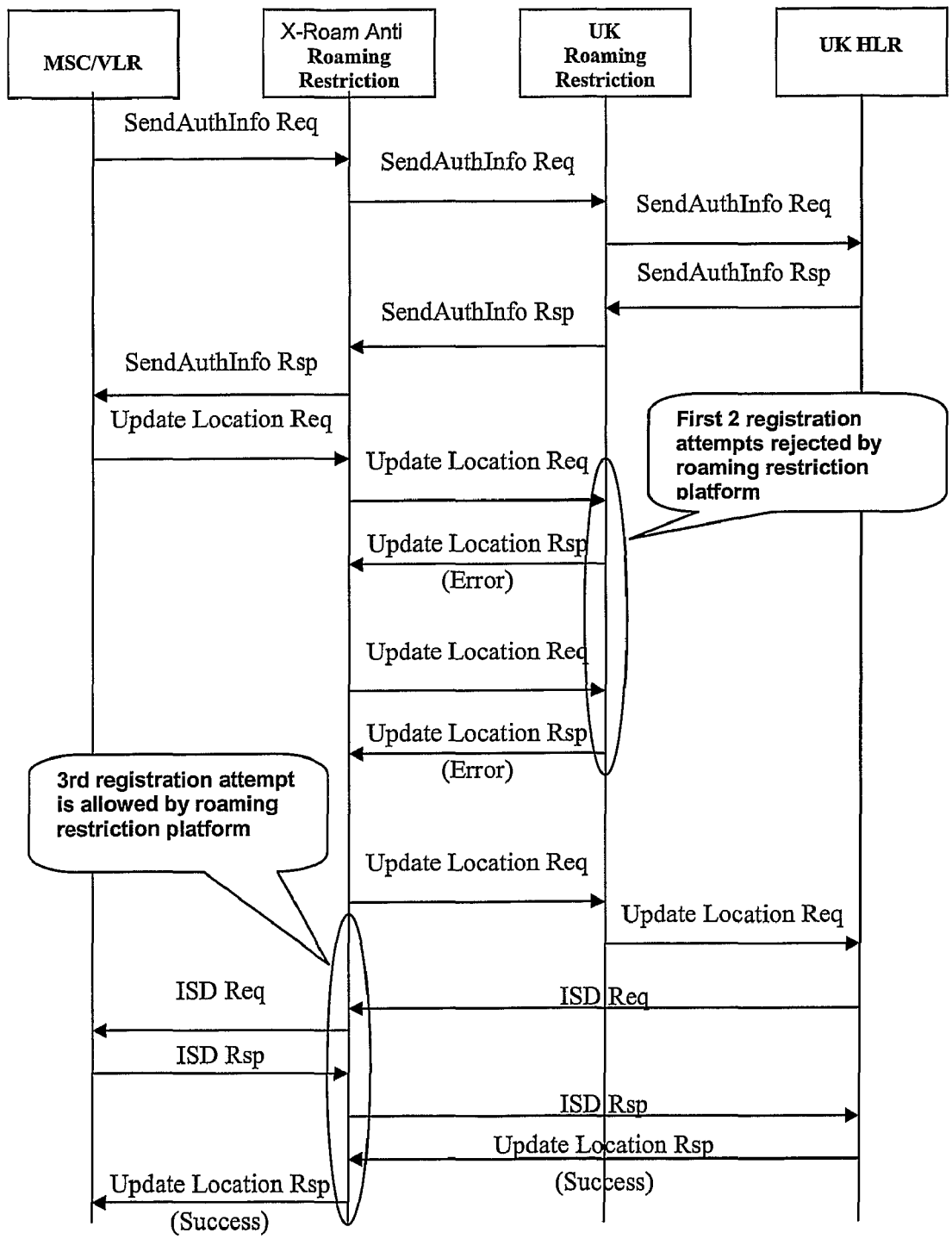
FIGS. 9 and 10 are diagrams illustrating operation of the gateway for control of mobile device roaming network connections.

FIG. 9 illustrates how the anti restricted roaming method operates during a subscriber registration. The example will consider a UK network subscriber roaming onto an Irish network. The gateway is called "X-Roam".

This example assumes the roaming restriction platform on the subscribers home network will stop trying to prevent the subscriber registering with the foreign network after three successive Update Location attempts. This number may be higher or lower. At this stage the HLR on the home network will forward the subscriber's details to the VLR in an Insert-SubscriberData message. The gateway will forward the ISD to the VLR but change the TCAP origination and destination Ids to match those of the relevant dialogue first (i.e. the UpdateLocation Dialogue originally opened by the VLR).

All messages coming to and going from each VLR on the network would have to be routed through the gateway. However in order to minimize its impact on network performance the platform would simply act as an SCCP router for traffic it did not need to handle (i.e. all traffic except UpdateLocation Req/Rsp, RestoreData Req/Rsp and InsertSubscriberData Req/Rsp).

Figure 10:
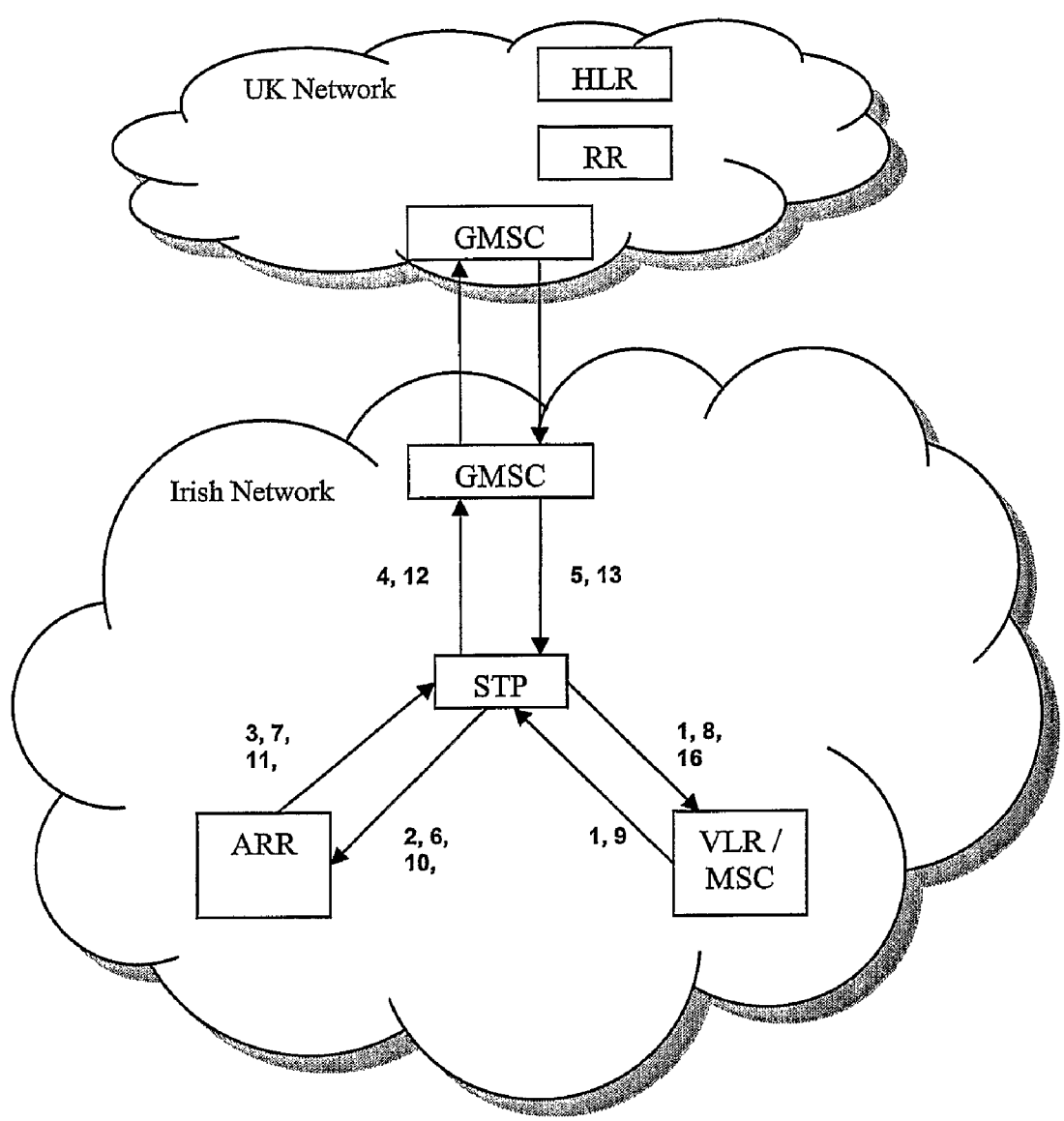

In the following case both the VLR and the gateway are connected to the same STP. In this case it is necessary for the STP to perform changes to the Global Title Addresses during routing are shown in FIG. 10. In this diagram, "ARR" is an application residing on the gateway.

The message flow and required Global Title routing for the successful UpdateLocation Req is as follows:

1. UpdateLocation Req from VLR to STP routing on global title.
2. GTT in the STP causes the UpdateLocation to be routed to the ARR
3. ARR initiates a new UpdateLocation Dialogue using the VLR address as the Calling Party Address. A set prefix is placed on front of the Called Party Address to prevent it from being looped back to the ARR by the STPs GTT rules.
4. The STP uses the prefixed E.214 number to route the UpdateLocation Req to the GMSC. It must be capable of stripping the prefix off the address before sending the message so the correct E.214 address is presented to the subscribers home network and therefore the correct HLR is located. Further UpdateLocation Requests from the same VLR will use E.164 numbering plan.
5. InsertSubscriberData Req is routed back to the STP with the called party address equal to the E.164 address of the VLR.
6. The STP must route this ISD to the ARR platform.
7. The ARR platform must change the TCAP originating and destination transaction Ids to match those of the original UpdateLocation Req dialogue from the VLR. A number of UpdateLocation Req attempts may have been initiated by the ARR platform before the subscribers registration is allowed (see message flow in FIG. 10). A set prefix is placed on front of the Called Party Address to prevent it from being looped back to the ARR by the STPs GTT rules.
8. The STP uses the prefixed E.164 number to route the InsertSubscriberData Req to the VLR. Again it should strip the prefix off the message before sending it.

9. The VLR sends the InsertSubscriberData Rsp to the STP. In this case the called party number will be the E.164 address of the subscribers HLR.
10. Again the STP must route this message to the ARR.
11. The ARR will change the TCAP originating and destination transaction Ids to match those of the transaction opened to the subscribers HLR. A set prefix will also be added to the start of the called party address and the message will be routed to the STP.
12. The STP will use the prefix to route the message towards the HLR, but strip the prefix off before forwarding the message, so the correct E.164 address is presented to the GMSC in the subscribers home network.
13. The UpdateLocation Rsp will be routed to the STP with a called party address equal to the E.164 number of the VLR.
14. The STP must route this UpdateLocation Rsp to the ARR.
15. The ARR will change the TCAP originating and destination transaction Ids to match those of the original UpdateLocation Req dialogue from the VLR. A set prefix will then be placed on front of the called party address and it will be sent to the STP.
16. The STP will route to the VLR based on this called party address and again strip the prefix off before sending the message.

The invention is not limited to the embodiments described but may be varied in construction and detail.

The invention claimed is:

1. A roaming gateway comprising:
an interworking processor;
at least one signaling stack for communication with a non-packet mobile network;
a packet interface for communication with a home packet-based network in which it resides;
an emulator in the interworking processor for emulating a non-packet mobile network entity to a foreign non-packet network Home Location Register (HLR); and
wherein:
the gateway resides in a packet network,
the emulator emulates a Mobile Switch Center (MSC) or a Visitor Location Register (VLR) to a roaming device non-packet home network HLR, and manages a Session Initiation Protocol (SIP) subscriber profile and Internet Protocol Multimedia Subsystem (IMS)-type subscriber authentication as if the packet network in which the gateway resides were the home network of said roaming device, in which the gateway in combination with the home network HLR operates as an IMS-standard Home Subscriber Server (HSS), and
the gateway:
receives SIP register requests from a serving Call Session Control Function (CSCF) element,
communicates with a different network for subscriber registration,
performs filtering of register requests to determine those it can act upon, and
relays the SIP register requests for onward processing,
and wherein:
the gateway examines a user identity in a SIP REGISTER request, upon roaming of an ANSI-41 subscriber or a Global System for Mobile Telecommunications (GSM) subscriber in the packet network, and
if the SIP user identity is recognized as a Mobile Directory Number (MDN) of a provisioned subscriber, the gateway retrieves a Mobile Subscriber Identification Number (MSID) and an Electronic Serial Number (ESN) for the subscriber from a database if known in the database, and if not known in the database the gateway resolves the MSID/ESN pair by sending an Mobile Directory Number (MDN)-based request to the subscriber's HLR, avoiding requirement for pre-provisioning of the MDN, MSID, and ESN for a roaming ANSI-41 subscriber in the packet network;
the gateway storing the MDN, MSID, and ESN triplet,
if the SIP user identity is recognized as a Mobile Subscriber Integrated Services Digital Network Number (MSISDN) of a provisioned subscriber, the gateway retrieves an International Mobile Subscriber Identity (IMSI) for the subscriber from a database if known in the database, and if not known in the database the gateway resolves the IMSI by sending an MSISDN-based request to the subscriber's HLR, avoiding requirement for pre-provisioning of the MSISDN and IMSI for a roaming GSM subscriber in the packet network;
the gateway storing the MSISDN/IMSI pair,
the gateway stores said subscriber identity information for a subsequent location registration.

2. The roaming gateway as claimed in claim 1, wherein the processor comprises functions in an application server, and a plurality of database servers.

3. The roaming gateway as claimed in claim 2, wherein the database servers provide redundancy in subscriber data storage.

4. The roaming gateway as claimed in claim 1, wherein the inter-working processor is configured to receive a route request from a HLR of a different network.

5. The roaming gateway as claimed in claim 1, wherein the inter-working processor automatically performs anti-restricted roaming by stopping attempts to prevent a subscriber registering with a foreign network after only a limited number of tries.

6. The roaming gateway as claimed in claim 1, wherein the gateway comprises means for communicating with a Short Message Service Center (SMSC) in a GSM or Universal Mobile Telecommunications System (UMTS) network and with a Message Center in a Code Division Multiple Access (CDMA) or Time Division Multiple Access (TDMA) network.

7. A non-transitory computer readable medium comprising software code for performing operations of a roaming gateway of claim 1 when executed on a digital processor.

* * * * *